United States Patent [19]

George

[11] Patent Number: 4,880,865

[45] Date of Patent: Nov. 14, 1989

[54] MICA AND GLASS REINFORCED POLYKETONE POLYMERS

[75] Inventor: Eric R. George, Houston, Tex.

[73] Assignee: Shell Oil Company, Houston, Tex.

[21] Appl. No.: 238,386

[22] Filed: Aug. 31, 1988

[51] Int. Cl.$^4$ .............................................. C08L 75/00
[52] U.S. Cl. ..................................... 524/449; 524/612; 525/85
[58] Field of Search ................. 524/449, 612; 525/185

[56] References Cited

U.S. PATENT DOCUMENTS 2,495,286 1/1950 Brubaker ................................ 260/63
3,694,412 9/1972 Nozaki .................................. 260/63
4,041,104 8/1977 Selley ..................................... 528/59

FOREIGN PATENT DOCUMENTS 121965 10/1984 European Pat. Off. .
181014 5/1986 European Pat. Off. .
1081304 3/1965 United Kingdom .

OTHER PUBLICATIONS

Kirk Othmer Encyclopedia of Chemical Technology, 2nd Ed., vols. 12, 13, pp. 13, 132 398–424 (1967).

*Primary Examiner*—Harold D. Anderson
*Assistant Examiner*—T. Mason
*Attorney, Agent, or Firm*—Dean F. Vance

[57] ABSTRACT

Polymer compositions having attractive mechanical properties comprise linear alternating polymers of carbon monoxide and at least one ethylenically unsaturated hydrocarbon and minor amounts, relative to the polymer, of glass fiber reinforcement and mica.

12 Claims, No Drawings

MICA AND GLASS REINFORCED POLYKETONE POLYMERS

FIELD OF THE INVENTION

This invention relates to certain polymer compositions having improved mechanical properties. More particularly, the invention relates to compositions comprising a linear alternating polyketone polymer reinforced with glass fibers and mica.

BACKGROUND OF THE INVENTION

Polymers of carbon monoxide and olefinically unsaturated organic compounds, or polyketones, have been known and available in limited quantities for many years. For example, polymers of ethylene or ethylene-propylene which contain small quantities of carbon monoxide are disclosed in U.S. Pat. No. 2,495,286, prepared using free radical catalysts. British Patent No. 1,081,304 discloses polymers containing higher concentrations of carbon monoxide prepared using alkylphosphine complexes of palladium salts as catalysts. A special class of linear polyketones is disclosed in U.S. Pat. No. 3,694,412, wherein the monomer units of carbon monoxide and olefinically unsaturated hydrocarbons occur in alternating order.

Polyketones are of considerable interest because they exhibit good physical properties. In particular, the high molecular weight linear alternating polymers have potential use as engineering thermoplastics due to their high strength, rigidity and impact resistance. These polymers can be represented by the general formula

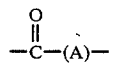

wherein A is the moiety obtained by polymerization of the olefinically unsaturated organic compound through the olefinic unsaturation. A general process for preparing such linear alternating polymers is disclosed, for example, in published European Patent Application Nos. 121,965 and 181,014. The process generally comprises contacting the monomers in the presence of a catalyst obtained from a compound of palladium, cobalt or nickel, the anion of a non-hydrohalogenic acid having a pKa less than about 2, and a bidentate ligand of phosphorus, arsenic or antimony. The resulting linear alternating polymers are generally high molecular weight thermoplastic polymers having utility in the production of articles for food and drink containers and for automobile parts.

Although the properties of the polyketones are suitable for many applications, it would be of advantage to provide polyketone compositions which exhibit less mold shrinkage and certain mechanical properties that are improved over the corresponding properties of the polymer alone.

SUMMARY OF THE INVENTION

This invention relates to improved polymer compositions comprising a major amount of a linear alternating polymer of carbon monoxide and at least one ethylenically unsaturated hydrocarbon and minor amounts, relative to the polymer, of glass fiber reinforcement and mica.

DESCRIPTION OF THE INVENTION

The polymers which are incorporated in the compositions of the invention are those linear alternating polyketones produced from carbon monoxide and at least one ethylenically unsaturated hydrocarbon. Suitable ethylenically unsaturated hydrocarbons for production of polyketones through polymerization with carbon monoxide are hydrocarbons of from 2 to 20 carbon atoms inclusive, preferably of up to 10 carbon atoms inclusive, and are aliphatic including ethylene and other alpha-olefins such as propylene, butene-1, isobutylene, octene-1 and dodecene-1, or are arylaliphatic containing an aryl substituent on an otherwise aliphatic molecule, particularly an alpha-olefin containing an aryl substituent on a carbon atom of the ethylenic unsaturation. Illustrative of this latter class are styrene, p-methylstyrene, m-ethylstyrene and p-propylstyrene. Preferred polyketone polymers for use in the compositions of the invention are copolymers of carbon monoxide and ethylene or terpolymers of carbon monoxide, ethylene and a second alpha-olefin of 3 or more carbon atoms, particularly propylene.

Polymers having carbon monoxide moieties alternating with ethylene and propylene moieties and have substantially one molecule of carbon monoxide for each molecule of total ethylene and propylene are of particular interest. Such polymers are often referred to as polyketones or polyketone polymers and are represented by the repeating formula

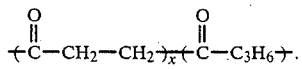

The

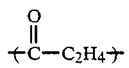

units and the

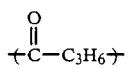

units are found randomly throughout the polymer chain and the

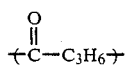

units are

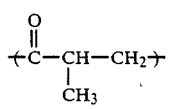

units or

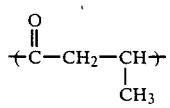

units, or both, depending upon the geometric nature of the polymerization. For copolymers, $X=O$. For terpolymers, the ratio of x:y will be such that the proportion of propylene will be no more than about 7% by weight, based on total terpolymer. Preferably, the ration of x:y is from about 8:1 to about 400:1 though ratios from 0.01 to about 0.1 are preferred.

The end groups of "caps" of the polymer will depend upon what materials were present during the production of the polymer and whether and how the polymer has been purified. The properties of the polymer will not, however, depend upon any particular end group so that the polymer is represented by the above formula for the polymeric chain. Of interest are the terpolymers of the above formula wherein the number average molecular weight is from about 5,000 to about 1,000,000 but particular those of molecular weight from about 20,000 to about 90,000, as measured by gel permeation chromatography (GPC).

Polymers of carbon monoxide and olefin(s) are produced by a variety of methods. FOr example, the production of polyketone polymers is discussed broadly in Kirk Othmer, Encyclopedia of Chemical Technology, 2nd Ed., Vol. 12, page 132 (1967). Production of polymers of relatively high carbon monoxide content is shown by UK 1,081,304 where alkylphosphine complexes of palladium salts were used as catalyst. Nozaki extended the reaction to produce linear alternating polymers in the presence of arylphosphine complexes of palladium moieties and certain inert solvents. See, for example, U.S. Pat. No. 3,694,412. More recent methods of producing polyketone polymers are illustrated by a number of published European Patent Application Nos. including 121,965, 181,014 and 213,671. These processes typically employ a catalyst composition formed from a compound palladium, cobalt or nickel, the anion of a strong non-hydrohalogenic acid and a bidentate ligand of phosphorus, arsenic or antimony. Without wishing to be limited, a preferred compound is a palladium carboxylate, particularly palladium acetate, a preferred anion is the anion of trifluoroacetic acid or p-toluenesulfonic acid and a a preferred bidentate ligand is 1,3-bis(diphenylphosphino)propane or 1,3[bis(di-2-methoxyphenyl)-phosphino]propane. Such a process is illustrated by copending U.S. patent application Ser. No. 930,468, filed Nov. 14, 1986 (Docket No. K-0722), incorporated herein by reference.

The composition of the polyketone polymer will depend to a considerable extent upon the proportions of the ethylenically unsaturated hydrocarbons, i.e., ethylene and propylene, present in the reaction mixture.

Of particular interest are the polyketones of molecular weight from about 1000 to about 200,000 especially those polymers of molecular weight from about 10,000 to about 50,000 and containing substantially equimolar quantities of carbon monoxide and ethylenically unsaturated hydrocarbon.

A method of producing polyketone polymers which is now becoming conventional is to contact the carbon monoxide and the ethylenically unsaturated hydrocarbon(s) under polymerization conditions in the presence of a catalyst formed from a metal compound of palladium, cobalt or nickel, an anion of a non-hydrohalogenic acid having a pKa less than about 6, preferably less than about 2, and certain bidentate ligands of nitrogen or of phosphorus, arsenic or antimony. Although the scope of the polymerization process is extensive, for purposes of illustration of a preferred method of producing the polyketone polymer, the metal compound is palladium acetate, the anion is the anion of trifluoroacetic acid or para-toluenesulfonic acid and the bidentate ligand is selected from 1,3-bis(diphenylphosphino)propane and 1,3-bis[di(2-methoxyphenyl)phosphino]propane.

Polymerization is typically carried out at elevated temperature and pressure in the gaseous phase in the substantial absence of reaction diluent or in the liquid phase in the presence of a reaction diluent such as a lower alkanol, e.g., methanol or ethanol. Suitable reaction temperatures are from about 20° C. to about 150° C. with preferred temperatures being from about 50° C. to about 125° C. The reaction pressure will typically be from about 1 bar to about 200 bar, preferably from about 10 bar to about 100 bar. The reactants and catalyst are contacted by conventional methods such as shaking or stirring and subsequent to reaction the polymer product is recovered as by filtration or decantation. The polymer product will, on occasion, contain metal or other residues of the catalyst which are removed, if desired, by treatment of the polymer product with a complexing agent or solvent which is selective for the residues.

The physical properties of the polymer and the compositions of the invention will be in part determined by the molecular weight of the polymer, whether the polymer is a copolymer or terpolymer and which unsaturated hydrocarbons have been employed in its production. Suitable linear alternating polyketones for use in the invention have limiting viscosity numbers (LVN) as measured in m-cresol at 60° C., using a standard capillary viscosity measuring device, in the range of about 0.5 to about 10 LVN, more preferably from about 0.8 to about 4 LVN and most preferably from about 1.1 to about 2.5. Typical melting points of the polyketone polymers are from about 175° C. to about 300° C., more frequently from about 210° C. to about 260° C.

The polymer compositions of the invention comprise the above polyketone polymers incorporating uniformly therein a minor proportion, relative to the polymer, of fibrous glass reinforcement.

The term "glass" is employed in the conventional meaning to indicate that class of complex metal silicates which are commonly referred to as glasses. Although the addition of rare earth metal oxides or transition metal oxides to other metal silicates on occasion will produce a glass of rather exotic properties, the glass from which the glass fiber of the invention is produced is the more common alkali metal silicate glass, particularly a sodium silicate glass. Fibers produced of such glass are conventional and are commercially available from a number of U.S. and foreign glass companies. The fibers are useful as reinforcements for polymeric products and are commercially used as such. However, the physical dimensions of the glass fibers are of some importance to successful utilization in a particular application as are the presence or absence of a sizing material or a coupling agent for the glass and the nature of the sizing or coupling agent.

In the polyketone/glass fiber compositions of the invention, the glass fibers which contribute the most desirable properties to the composition are chopped glass fibers of circular cross-section. The fibers range in diameter from about $2 \times 10^{-4}$ inch to about $8 \times 10^{-4}$ inch, preferably from about $4 \times 10^{-4}$ inch to about $7 \times 10^{-4}$ inch. Fibers of greater or lesser diameter are satisfactory but fibers of too small a diameter do not provided the desired strength and fibers of too large a diameter contribute too much weight for the resulting strength and may not be economical. Although in some applications the long continuous fibers of glass are satisfactory, in the compositions of the invention it is preferred to use short fibers of glass. Lengths of glass fiber from about 0.1 inch to about 0.5 inch are suitable. While somewhat longer or somewhat shorter lengths are also useful, too long a glass fiber detracts from the processability of the composition while too short a fiber does not provide the desired strength. It is recognized that the actual length of the glass fibers in the composition will depend to some extent upon the method of blending or mixing the components, as this may mechanically break down the length of the glass fibers.

The glass fibers to be used as reinforcements for plastic materials will customarily be provided by the manufacturer with a coating of a sizing material or a coupling agent, which terms are often used interchangeably. The nature of the sizing or coupling agent will influence the interfacial shear strength of the fiber and the polymer matrix, i.e., the degree to which the polymer and glass fiber will adhere. Improvement in mechanical properties, such as tensile strength, result when a relatively high degree of adhesion occurs between the polymer and the fiber. To contribute strength to a polymer blend, the interfacial shear strength will be at least comparable in magnitude to the shear strength of the polymer so that there will be good adhesion between the polymer and the glass fiber. The interfacial shear strength is influenced by the polarity of the polymer so that for some polymers certain sizings or coupling agents work better than other. For the case of blends containing polyketone polymers a variety of sizings are suitable. Such sizings are generally characterized by the general nature of the size rather than the specific chemical structures which are often proprietary to the glass fiber manufacturer. Suitable sizings include water emulsions of starch and lubricating oil, aqueous dispersions of surface active materials and lubricants, silicon-containing materials such as vinyl silanes, alkyltrimethoxysilanes, amino silanes, trimethoxysilanes which may also contain urethane, acrylate or epoxy functionalities, and non-polar hydrocarbons. For use in the blends of the invention, polar sizings are preferred, such as a sizing having a trimethoxysilane end group attached to a hydrocarbon chain with a terminal urethane functionality, although other hydrocarbon sizings having a trimethoxysilane end group are also quite suitable. Such fibers are commercially available and are exemplified by OCF 492 Fiberglass and OCF 457 Fiberglass which are available from Owens-Corning Fiberglass.

The amount of glass fiber to be incorporated into the compositions of the invention is a minor amount relative to the polymer which is present as the major component in the total composition. Amounts of glass fiber loading from about 1% by weight to about 45% by weight, based on the total composition, are satisfactory with amounts from about 5% by weight to about 35% by weight, based on the total composition, being preferred.

Mica is used within the scope of the present invention. Mica, usable herein is typically in the physical form of flat, long platelets having a high aspect ratio, i.e., a ratio of length of the particle to thickness of that particle of up to 20:1, preferably of up to 100:1. The use of the flat, plate-like mica particles provides increased barrier properties, presumably through a reduction in the rate of diffusion of a gas or liquid through the glass filled polymer as the diffusing species must travel a tortuous path around platelets through the polymer.

The micas which are suitably employed in the invention are silicate materials characterized physically as flat, six-sided monoclinic crystals which undergo a nearly perfect basal cleavage to yield the thin, flexible flakes. The actual chemical compositon will vary over a range of micas. Phlogopite is a preferred mica but other natural or synthetic micas such as muscovite, biolite, fluorophlogopite, and barium fluorophlogopite, and barium disilicate can be used. Micas are further discussed in Kirk Othmer, Encyclopedia of Chemical Technology, 2nd Ed., Vol. 13, pp. 398-424, incorporated herein by reference.

The size of the mica particles which are useful in the invention can vary but particles from about 50 mesh to about 600 mesh are suitable with particles from about 100 mesh to about 400 mesh being preferred. The amount of mica to be incorporated into the polyketone polymer is a minor amount relative to the polyketone. Amounts of mica from about 5% by weight to about 45% by weight, based on the filled polymer composition are satisfactory with amounts from about 10% by weight to about 35% by weight on the same basis being preferred. When mica is to be employed in a filled polyketone polymer, the filled composition is produced by conventional methods which will provide a substantially uniform mixture of the mica throughout the polymer matrix.

The use of mica in the glass filled polyketone polymers offers good strength and modulus of the polymer, control of warpage, with retention of impact strength. Some thermoplastic polymers do not compound well with untreated mica because of poor adhesion between the polymer and the mica particles. This lack of adhesion results in a phenomena known as stress-whitening being observed when polymer is used to make thermoformed or solid phase pressure formed articles. To avoid this "whitening", when mica is compounded with other thermoplastic polymers, a silane or other coupling agent must be used to promote or increase the degree of adhesion between the polymer and the mica for example, Aspralok 100. Typical coupling agents are trimethoxysilanes having as a fourth silicon substituent a group which is compatible with the polymer in which the mica is to be compounded. In contrast, the mica-compounded polyketone polymers are produced without the need for a coupling agent and yet containers molded therefrom exhibit little or no stress-whitening. Micas contemplated as usable herein include Asprapearl 100 and Aspraflex 100, available from J. M. Huber Co.

Additionally, processing agents, like Nucrel 010, an ethylene methacrylic acid copolymer can be added to the blend in amounts from 0.1 to 5 wt % to facilitate processing of the polymer system.

The method of producing the compositions of the invention is not critical so long as an intimate mixture of the two components is produced without undue degradation of the components or the resulting composition. In one modification the components are dry mixed and converted to a blended composition by application of elevated temperature and pressure. In an alternate modification, the components are passed through an extruder to produce the composition as an extrudate. The components are also usefully blended in a mixer which operates at elevated temperature at high shear.

The compositions of the invention may also include other conventional additives such as antioxidants, pigments like $TiO_2$ and/or EVA Black, stabilizers, mold release agents, fire retarding chemicals and other materials which are designed to improve the processability of the polymer or the properties of the resulting composition. The additive can be used in minor amounts from 0.1 to 5% by weight based on the total composition. Such additives are added together with, prior to or subsequent to the blending of the polymeric and glass fiber components. The resulting compositions are processed by conventional methods such as injection molding, pressure forming, thermoforming, sheet extrusion and sheet casting which do not serve to degrade the polymer or the composition.

The basically three-part blends of: polyketone polymer, glass fiber, and mica are essentially uniform blends which exhibit less mold shrinkage, improved resistance to warpage and have improved mechanical properties in view of blends of polymer without glass fiber or mica. The compositions have particular utility in the production of mechanical parts, such a automobile valve covers cowl vent grills, etc. particularly those requiring dimensional stability at high temperatures. It is expected that mica/glass provides improved UL continuous use temperature.

The compositions of the invention are further illustrated by the following Illustrative Embodiments which should not be construed by limiting.

ILLUSTRATIVE EMBODIMENT I

A blend of two linear alternating terpolymers of carbon monoxide, ethylene and propylene, 37 wt % 88/005 and 63 wt % 88/006 was prepared as Formulation 1. Each terpolymer was prepared in the presence of a catalyst formed from palladium acetate, the anion of trifluoroacetic acid, and 1,3-bis(diphenylphosphino)propane. Polymer 88/005 had a melting point of 223° C. and a limiting viscosity number (LVN) of 1.79 measured at 60° C. in m-cresol, and Polymer 88/006 had a melting point of 220° C. and an LVN of 1.62 measured at 60° C. in m-cresol.

ILLUSTRATIVE EMBODIMENT II 80.5 wt % of Formulation 1 was blended with 5% by weight glass fibers (GF) OFC 492AA, commercially available from Owens Corning Fiberglass. This ⅛" glass fiber of an E type, had a density of about 2.6 g/cc. This glass fiber was sized with a sizing agent designed for blending with polyesters. 10% mica, in this formulation, Aspralok 100, available from J. M. Huber Co., was added to the blend along with 2 wt % Nucrel 010 (as a processing aid) and 2.5 wt % of a blend of EVA Black and $TiO_2$ for pigmentation. The components were blended in a conventional manner then extruded into water and pelletized. Pellets were dried, then, injection molded into standard ASTM tensile bars for testing. This formulation is designated as Formulation 2. Modulus, flex strength and notched izod values were obtained using standard ASTM test methods. The measures values for the molded samples are reported in Table 1.

TABLE 1

|  | Formulation 1 | Formulation 2 |
|---|---|---|
| SAMPLE A |  |  |
| 88/005 + 88/006 (%) | 100 | 80.5 |
| Glass Fiber (%) | — | 5 |
| Mica (%) | — | 10 |
| Processing Aid (%) | — | 2 |
| Pigment (%) | — | 2.5 |
| Flexural Modulus[1] (psi) | 263,000 | 400,000 |

TABLE 1-continued

|  | Formulation 1 | Formulation 2 |
|---|---|---|
| Notched Izod[4] (ft.lb/in.) | 3.0 | — |
| Room Temp. | — | 1.8 |
| −20° F. | — | 0.9 |
| CLTE (in./in./°F. × $10^{-5}$) |  |  |
| Machine Direction | 7.4 | 5.8 |
| Transverse Direction | 6.2 | 6.8 |
| HDT (°F. at 264 psi) | 205 | 240 |
| Tensile Strength[3] (psi) |  |  |
| Yield | — | 8200 |
| Break | — | 7500 |
| Elongation (%) |  |  |
| Yield | — | 17 |
| Break | — | 69 |
| Gardner Impact[2] (in./lb) |  |  |
| Room Temp. | — | 40 |
| −20° F. | — | 12 |
| Rheometrics Impact |  |  |
| Room Temp. | — | 320 lbs.–265 mils |
| −20° F. | — | 320 lbs.–139 mils |
| Mold Shrinkage | — | 2.1 |

[1]ASTM D-790
[2]ASTM D-3029
[3]ASTM D-638
[4]ASTM D-256

ILLUSTRATIVE EMBODIMENT III 67.5% of Formulation I was blended with 20% by weight of mica-Aspralok 100, commercially available from J. M. Huber Co. and 10% by weight glass fibers-OCF 492AA available from Owens Corning, 2.0% Nucrel 010 and 0.5% EVA Black using conventional mixing devices. Blended samples were extruded into water and pelletized. Pellets were dried in an oven at about 140° F. for about 6 hours prior to molding into standard ASTM tensile bars for testing. This formulation is referred to hereafter as Formulation 3. Modulus, flex strength and notched izod and other standard ASTM tests were performed on Formulation 3. The measured values are reported in Table 2.

TABLE 2

| PROPERTY | FORMULATION 3 |
|---|---|
| Flexural Modulus (psi) | 832,000 |
| Flexural Strength (psi) | 17,500 |
| Notched Izod Impact (ft.lb./in) | 1.3 |
| Tensile Strength (psi) (2"/min) |  |
| Yield | 11,900 |
| Break | 11,800 |
| Elongation to break | 14.0 |
| CLTE (in./in./°F.) × $10^{-5}$ |  |
| Machine Direction | 2.3 |
| Transverse Direction | 3.0 |
| HDT (°F. at 264 psi) | 410 |

Samples of Formulation 3 were oven aged for two weeks at 140° C. and two weeks at 160° C., respectively. The results appear on Table 3.

TABLE 3

| Formulation 3 | Oven Aging 2 Weeks at 140° C. | Oven Aging 2 Weeks at 160° C. |
|---|---|---|
| Tensile Strength (psi) (2"/min) |  |  |
| Yield | 10,100 | 10,900 |
| Break | 10,100 | 10,900 |
| Elongation (%) |  |  |
| Break | 2.5 | 2.9 |
| Notched Izod (ft.lb./in) | 1.1 | 1.2 |

This data reveals that the novel combination of mica, glass fiber and polyketone can unexpectedly withstand oven aging at elevated temperatures yet still retain their inherent good properties.

ILLUSTRATIVE EMBODIMENT IV

A blend of two linear alternating terpolymers of carbon monoxide, ethylene and propylene, 37 wt % 088/006 and 63 wt % 087/015 was prepared as Formulation 4. Each terpolymer was prepared in the presence of a catalyst formed from palladium acetate, the anion of trifluoroacetic acid, and 1,3-bis(diphenyl-phosphino)-propane. Polymer 088/006 had a melting point of 220° C. and an LVN of 1.62 as measured at 60° C. in m-cresol. Polymer 087/015 had a melting point of 228° C. and an LVN of 1.5 as measured at 60° C. in m-cresol.

ILLUSTRATIVE EMBODIMENT V

68% by weight of Formulation 4 was blended with 10% by weight glass fibers OCF 492AA available from Owens Corning, with 20% by weight of mica, Aspralok 1000 available from J. M. Huber Co, and 2% by weight Nucrel 010 forming Formulation 5. Blending of the components, pelletizing of the resultant blend, and formation of tensile bars was carried out as in Illustrative Embodiment II. The samples were tested as indicated in the prior Embodiments and the results appear on Table 4.

ILLUSTRATIVE EMBODIMENT VI

Formulation 6 was prepared in a manner identical to Formulation 5 except that 30% by weight of mica and 5% by weight of glass fibers were used. The samples were tested as in the prior Embodiments and the results appear on Table 4.

TABLE 4

| Tests | Formulation 5 | Formulation 6 |
| --- | --- | --- |
| Flexural Modulus (psi) | 795,000 | 735,000 |
| Flexural Strength | 16,900 | 14,800 |
| Notched Izod (ft.lb./in.) | 1.34 | 1.21 |
| Tensile Strength (psi) | 10,400 | 9,100 |
| Elongation to Break (%) | 16 | 20 |

Tables 1 to 4 illustrate that the mica/glass combination leads to a stiffer material with decreased mold shrinkage and good CLTE when compared to the neat polymer. Reduced warpage in molded products has been unexpectedly discovered with the novel, synergistic combination of mica/glass and polyketon materials. This reduced warpage by the mica/glass and polyketone material is due to a change in the heat material's properties from Anisotropic to isotropic.

What is claimed is:

1. A polymeric composition comprising a major amount of a linear alernating polymer of carbon monoxide and at least one ethylenically unsaturated hydrocarbon and minor amounts, relative to the polymer, of glass fiber reinforcement and mica.

2. The composition of claim 1 wherein the glass fiber reinforcement is present in an amount from about 1% by weight to about 45% by weight, based on the total composition and the mica is present in an amount from about 1% by weight to about 45% by weight based on the total composition.

3. The composition of claim 2 wherein the ethylenically unsaturated hydrocarbon is ethylene.

4. The composition of claim 11 wherein the quantity of fibrous glass reinforcement is from about 5% by weight to about 35% by weight, and the quantity of mica is from about 5% by weight to about 35% by weight based on total composition.

5. The composition of claim 4 wherein the ethylenically unsaturated hydrocarbon is an alpha-olefin having from 3 to 10 carbon atoms.

6. The composition of claim 5 wherein the alpha-olefin is propylene and the ratio of y:x is from about 0.01 to about 0.1.

7. The composition of claim 1, further comprising a processing agent in amounts from 0.1 to 5 wt %.

8. The composition of claim 7, wherein the processing agent is an ethylene methacrylic acid copolymer.

9. The composition of claim 1, further comprising up to 5 wt % of an additional additive.

10. As an article of manufacture, a molded article comprising the composition of claim 1.

11. A polymeric composition comprising a linear alternating polymer of the formula wherein B is the moiety of an ethylenically unsaturated hydrocarbon of at least 3 carbon atoms polymerized through the ethylenic unsaturation, the ratio of y:x is no more than about 0.5, and a quantity from about 1% by weight to about 45% by weight, based on the total composition, of fibrous glass reinforcement and a quantity from about 1% by weight to about 45% by weight based on the total composition of mica incorporated therein.

12. The composition of claim 11 wherein y is zero.

* * * * *